March 18, 1930.　　　　S. STARK　　　　1,750,910

PROJECTING APPARATUS

Filed March 14, 1925

INVENTOR.
Sander Stark
BY Frederick F. Church
his ATTORNEY

Patented Mar. 18, 1930

1,750,910

UNITED STATES PATENT OFFICE

SANDER STARK, OF ROCHESTER, NEW YORK, ASSIGNOR TO BAUSCH & LOMB OPTICAL COMPANY, OF ROCHESTER, NEW YORK, A CORPORATION OF NEW YORK

PROJECTING APPARATUS

Application filed March 14, 1925. Serial No. 15,448.

My present invention relates to projection apparatus particularly of the type employed for cinematographic projection with special reference to that kind of cinematographic projector commercially known as the reflector arc or low intensity arc and it has for its object to provide a means or method by which a cinematograph projector of the type mentioned can be used for the projection of lantern slides or similar transparencies. A further object of the invention is to provide generally for the projection of lantern slides or the like through the use of a reflector arc as illuminant. To these and other ends the invention resides in certain improvements and combinations of parts all as will be hereinafter described, the novel features being pointed out in the claims at the end of the specification.

In the drawings.

Similar reference numerals throughout the several views indicate the same parts.

Figure 1:
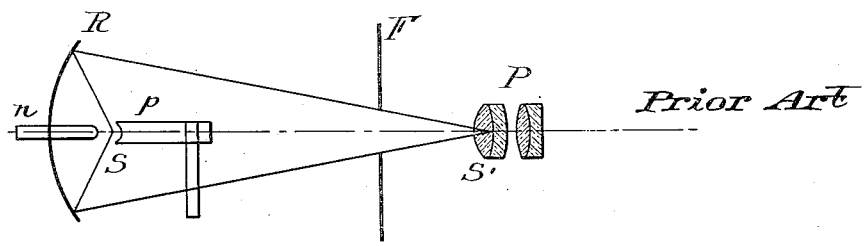
Figure 1 is a semi-diagrammatic view of a known type of reflector arc or low intensity arc cinematograph projector.

At the present time there are in use cinematograph projectors which employ an illuminant known as the reflecting arc or the low intensity arc and in Figure 1, I show the optical arrangement of such a projector. R is a reflecting mirror (which can be spherical, paraboloidal, ellipsoidal, etc.) which mirror images the light source S and S' in the cinematograph projection lens P. F, interposed in the cone or pencil of light, represents the gate and aperture of the cinematographic machine which is projected upon the screen together with the cinematograph or picture area that is in it. Due to the hole in the mirror caused by the introduction through it of the negative carbon $n$ as well as the shadow of the positive carbon $p$ and its holder or support, there is but a comparatively small region in the vicinity of F along the cone and a comparatively small area in any particular section in this region through the cone in which there is homogeneous radiation. This small region and section F in the cone of light issuing from the mirror is chosen for the position of the cinematograph picture, because it is the only section of the cone in which a region large enough to illuminate a cinematograph picture evenly, exists due as was mentioned to the inhomogeneity of the cone of light caused by the shallow of the positive carbon, its holder etc.

It is evident then that an object as large as is a lantern slide (4 times the dimensions of a cinematograph picture) cannot be put into the cone from the reflector and be evenly illuminated. If it is placed near the mirror the center of the slide will be dark. If it is placed near F the center or an area as large as a cinematograph picture will be bright and the edge will be dark.

This invention, nevertheless, results in a convenient method for projecting lantern slides by means of a so-called reflecting arc of this character.

Figure 2:
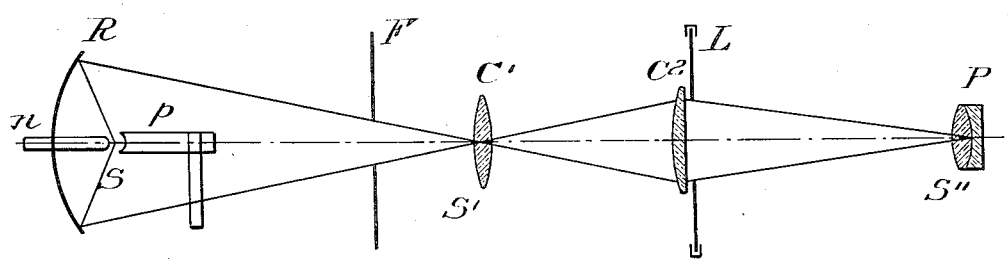
Figure 2 is a similar view of this type of projector constructed in accordance with and illustrating one embodiment of my invention.

Figure 2 represents an optical arrangement by means of which lantern slides can be projected with a reflector arc as illuminant, and which embodies my invention. As before, R is a reflector, S is the source of light and F is the position of the film aperture which is in a position along the cone that has an area as large as a cinematograph picture which is homogeneously illuminated. In the image of S at S' is placed a condensing system $C_1$ of suitable focal length so that the film gate or aperture F is imaged at L, with a magnification of 4, that is, the size of a lantern slide. L represents any suitable form of lantern slide holder. In the plane of the lantern slide and holder L is placed a condensing system $C_2$ of such focal length that S' the image of S is imaged at S'' in the lantern slide projection lens P which imagery is a necessary condition for satisfactory lantern slide projection.

In short, I have taken the only homogeneously illuminated section of the cone of light, the size of a cinematograph picture and adequate to illuminate that alone, and imaged and magnified this evenly illuminated section to the size of a lantern slide and have then projected upon the screen the lantern slide so illuminated and placed in the magnified image of the cinematograph aperture.

Figure 3:
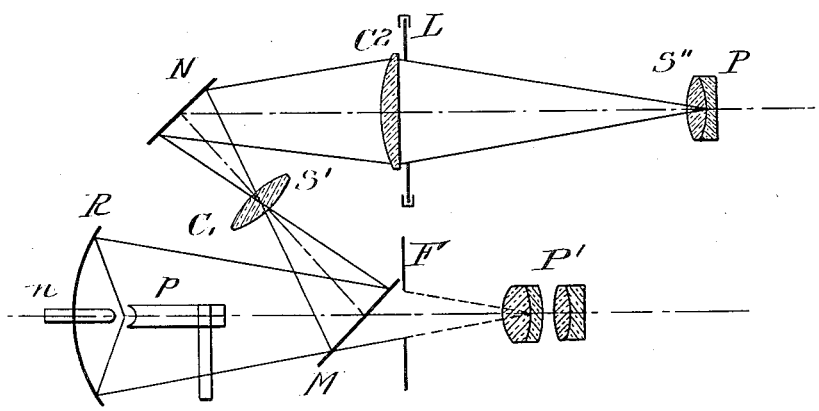
Figure 3 is a similar view of a modified embodiment of my invention.

It is understood that I have described but one specific form of my invention and that other forms exist which do not in the least depart from the spirit of my invention. In fact, any arrangement of parts mechanical or optical in which the evenly illuminated cinematograph aperture F is imaged by a system such as $C_1$ at L of a size sufficient to cover a lantern slide, and in which $C_1$ or the light source image in it is imaged by another system $C_2$ in the projection lens falls within the scope of my invention. For instance the arrangement of optics shown in Figure 3 is within the scope of my invention.

In this figure, the parts similarly lettered function as before in the other embodiment but at the film gate aperture F the light pencil from arc reflector R is caught by a mirror M which reflects it at an angle to a focus in S' with condensing system $C_1$ arranged to one side of the former axis. From $C_1$ the rays strike another mirror N and from thence pass to condenser $C_2$, slide holder L and projector P as before. The practical difference is that alternative projection of cinematograph or lantern slide is accomplished on different but parallel axes though with the same point of light source and the slide holder L and gate F may be arranged in the same plane. The mirror M of course is removable when it is desired to use the apparatus for cinematographic projection. As shown in Fig. 3, the objective lens P' is used for cinematograph projection, when such is desired.

I claim as my invention:

1. In a projection apparatus, the combination with a light source embodying a reflecting arc forming a convergent light pencil having a homogeneous portion, and a condenser arranged in the focal point thereof to magnify the homogeneous portion of the light pencil, of a second condenser so located with respect to the first as to receive the image of said homogeneous portion as projected by said first condenser, a lantern slide holder arranged closely adjacent to the plane of the second condenser, and a projector lens in which the image formed by the second condenser is imaged.

2. An optical projecting system comprising a light source $S_1$, a cinematograph aperture F and a lantern slide holder L with an interposed condensing system $C_1$ for imaging the aperture F at the holder L, a projector lens P, and a lens system $C_2$ for producing an image of the light source at the projector lens P substantially as described.

3. In a projection apparatus, the combination of a light source, a curved reflector cooperating with said source to focus the light rays at a point, a condenser positioned at said point, an aperture located between said condenser and said source, a second condenser adapted to receive the image of the aperture formed by said first mentioned condenser, a lantern slide holder positioned closely adjacent said second condenser and a projecting lens adapted to receive the image formed by the second condenser, the optical axes of all of the optical elements being coincident.

4. In a projection apparatus, a curved reflector, a light source in front of said reflector, a condenser poistioned in the optical path of rays from the reflector at a point which is conjugate to the location of the light source, means in the optical path of light rays from said reflector whereby a homogeneous pencil of light rays will reach said condenser, a second condenser in the optical path of rays from said first condenser and adapted to receive the image formed by said first mentioned condenser, a lantern slide holder arranged closely adjacent to the plane of the second condenser, and a projecting lens positioned in the optical path of rays from the second condenser to receive the image from said second condenser.

SANDER STARK.